(12) United States Patent
Komma et al.

(10) Patent No.: US 10,173,539 B2
(45) Date of Patent: Jan. 8, 2019

(54) BATTERY CHARGING SYSTEM AND METHOD FOR CABLELESS CHARGING OF A BATTERY WITH VOLTAGE AND CURRENT SENSORS ON BOTH THE PRIMARY AND SECONDARY SIDES AND A DC-DC CONVERTER ON THE PRIMARY SIDE INVOLVED IN AN EFFICIENCY CALIBRATION POWER LOOP

(75) Inventors: Thomas Komma, Ottobrunn (DE); Stephan Rupf, Claussnitz (DE); Jörg Weiss, Chemnitz (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 400 days.

(21) Appl. No.: 14/425,099

(22) PCT Filed: Aug. 31, 2012

(86) PCT No.: PCT/EP2012/066988
§ 371 (c)(1),
(2), (4) Date: Apr. 20, 2015

(87) PCT Pub. No.: WO2014/032728
PCT Pub. Date: Mar. 6, 2014

(65) Prior Publication Data
US 2015/0291042 A1 Oct. 15, 2015

(51) Int. Cl.
*H02J 7/02* (2016.01)
*B60L 11/18* (2006.01)
(Continued)

(52) U.S. Cl.
CPC ......... *B60L 11/182* (2013.01); *B60L 11/1824* (2013.01); *B60L 11/1838* (2013.01);
(Continued)

(58) Field of Classification Search
CPC ............... B60L 11/182; B60L 11/1824; B60L 11/1838; B60L 11/1861; H02J 50/80; H02J 50/10; H02J 7/007; H02J 7/025
(Continued)

(56) References Cited

U.S. PATENT DOCUMENTS

| 4,146,830 A | 3/1979 | Foster |
| 5,594,318 A * | 1/1997 | Nor ..................... B60L 11/1816 320/108 |

(Continued)

FOREIGN PATENT DOCUMENTS

| CN | 101573851 A | 11/2009 |
| DE | 2709863 A1 | 9/1977 |

(Continued)

*Primary Examiner* — Robert Grant
*Assistant Examiner* — John Trischler
(74) *Attorney, Agent, or Firm* — Laurence Greenberg; Werner Stemer; Ralph Locher (57) ABSTRACT

A battery charging system for cablelessly charging a battery includes a primary-side charging unit as a primary side, a secondary-side charging unit as a secondary side, a transformer having a primary-side winding as part of the primary side and a secondary-side winding as part of the secondary side, one controller on the primary side and one controller on the secondary side, one voltage sensor on the primary side and one voltage sensor on the secondary side, one current sensor on the primary side and one current sensor on the secondary side, one communication unit on the primary side and one communication unit on the secondary side, and one direct current converter provided on the primary side only.

8 Claims, 5 Drawing Sheets

(51) Int. Cl.
*H02J 50/12* (2016.01)
*H02J 50/60* (2016.01)
*H02J 7/00* (2006.01)
*H02J 50/10* (2016.01)
*H02J 50/80* (2016.01)

(52) U.S. Cl.
CPC ........... *B60L 11/1861* (2013.01); *H02J 7/007* (2013.01); *H02J 7/025* (2013.01); *H02J 50/10* (2016.02); *H02J 50/12* (2016.02); *H02J 50/60* (2016.02); *H02J 50/80* (2016.02); *B60L 2230/10* (2013.01); *Y02T 10/7005* (2013.01); *Y02T 10/7088* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01)

(58) Field of Classification Search
USPC .......................................... 320/108; 307/104
See application file for complete search history.

(56) References Cited

U.S. PATENT DOCUMENTS

| | | | | |
|---|---|---|---|---|
| 5,896,278 A * | 4/1999 | Tamura | ................ | H01F 38/14 363/20 |
| 5,929,598 A * | 7/1999 | Nakama | ................ | H02J 50/12 320/108 |
| 5,982,151 A * | 11/1999 | Nagai | ................ | H02J 7/0029 320/141 |
| 6,297,616 B1 * | 10/2001 | Kubo | ................ | H02J 7/0027 320/116 |
| 6,586,909 B1 * | 7/2003 | Trepka | ................ | H01M 10/46 320/108 |
| 6,975,095 B2 * | 12/2005 | Ooi | ................ | G01R 31/3613 320/132 |
| 7,378,818 B2 * | 5/2008 | Fowler | ................ | B60L 11/185 320/108 |
| 7,626,365 B2 * | 12/2009 | Patino | ................ | H02J 7/025 320/138 |
| 7,683,586 B2 * | 3/2010 | Davison | ................ | H02H 1/06 320/139 |
| 7,948,209 B2 * | 5/2011 | Jung | ................ | H02J 7/025 307/104 |
| 8,004,235 B2 * | 8/2011 | Baarman | ................ | H02J 7/0072 320/108 |
| 8,069,100 B2 * | 11/2011 | Taylor | ................ | G06Q 20/10 320/108 |
| 8,120,311 B2 * | 2/2012 | Baarman | ................ | H02J 7/0004 320/106 |
| 8,183,828 B2 * | 5/2012 | Tanabe | ................ | H02J 7/025 307/104 |
| 8,234,189 B2 * | 7/2012 | Taylor | ................ | G06Q 20/10 307/25 |
| 8,278,878 B2 * | 10/2012 | Ishikawa | ................ | G01R 19/10 320/116 |
| 8,373,385 B2 * | 2/2013 | Takagi | ................ | H02J 7/025 320/108 |
| 8,400,105 B2 * | 3/2013 | Kondo | ................ | H01M 10/4257 320/106 |
| 8,446,046 B2 * | 5/2013 | Fells | ................ | H02J 5/005 307/104 |
| 8,452,235 B2 * | 5/2013 | Kirby | ................ | H02J 7/025 455/41.1 |
| 8,497,658 B2 * | 7/2013 | Von Novak | ................ | H02J 7/025 320/108 |
| 8,558,411 B2 * | 10/2013 | Baarman | ................ | H02J 5/005 307/104 |
| 8,581,542 B2 * | 11/2013 | Cook | ................ | H01Q 1/243 320/108 |
| 8,593,105 B2 * | 11/2013 | Baarman | ................ | H02J 7/025 320/108 |
| 8,610,400 B2 * | 12/2013 | Stevens | ................ | H02J 5/005 307/104 |
| 8,614,561 B2 * | 12/2013 | Tanabe | ................ | H02J 7/025 307/104 |
| 8,620,484 B2 * | 12/2013 | Baarman | ................ | H01F 38/14 320/106 |
| RE44,713 E * | 1/2014 | Jung | ................ | H02J 7/025 307/104 |
| 8,629,650 B2 * | 1/2014 | Mohammadian | .... | G06K 7/0008 320/108 |
| 8,716,974 B2 * | 5/2014 | Sakoda | ................ | B60L 11/182 307/104 |
| 8,731,116 B2 * | 5/2014 | Norconk | ................ | H04B 5/0031 340/10.1 |
| 8,766,487 B2 * | 7/2014 | Dibben | ................ | H02J 5/005 307/104 |
| 8,796,999 B2 * | 8/2014 | Toncich | ................ | H02J 7/007 320/155 |
| 8,823,319 B2 * | 9/2014 | Von Novak, III | ...... | H02J 7/025 320/108 |
| 8,836,166 B2 * | 9/2014 | Maher | ................ | H02H 1/06 307/104 |
| 8,836,271 B2 * | 9/2014 | Mitake | ................ | B60L 11/1816 320/104 |
| 8,847,546 B2 * | 9/2014 | Baarman | ................ | H02J 7/0004 320/106 |
| 8,853,995 B2 * | 10/2014 | Von Novak | ........... | H02J 7/0054 320/103 |
| 8,872,472 B2 * | 10/2014 | Baarman | ................ | H02J 7/025 320/108 |
| 8,884,468 B2 * | 11/2014 | Lemmens | ................ | H02J 5/005 307/104 |
| 8,884,469 B2 * | 11/2014 | Lemmens | ................ | H02J 5/005 307/104 |
| 8,922,329 B2 * | 12/2014 | Davis | ................ | H02J 7/025 340/3.1 |
| 8,934,857 B2 * | 1/2015 | Low | ................ | H02J 7/025 455/129 |
| 8,942,624 B2 * | 1/2015 | Singh | ................ | H04B 5/0037 455/41.1 |
| 8,963,486 B2 * | 2/2015 | Kirby | ................ | H02J 7/355 320/108 |
| 8,963,488 B2 * | 2/2015 | Campanella | ............ | H02J 5/005 320/108 |
| 9,007,019 B2 * | 4/2015 | Iijima | ................ | H02J 7/0052 320/108 |
| 9,035,501 B2 * | 5/2015 | Azancot | ................ | H01F 38/14 307/104 |
| 9,048,696 B2 * | 6/2015 | Azancot | ................ | H01F 38/14 |
| 9,075,587 B2 * | 7/2015 | Tsai | ................ | G06F 1/266 |
| 9,083,204 B2 * | 7/2015 | Azancot | ................ | H01F 38/14 |
| 9,099,239 B2 * | 8/2015 | Abe | ................ | H02J 5/005 |
| 9,106,269 B2 * | 8/2015 | Moes | ................ | H04B 5/0025 |
| 9,136,734 B2 * | 9/2015 | Azancot | ................ | H01F 38/14 |
| 9,154,002 B2 * | 10/2015 | Norconk | ................ | H02J 5/005 |
| 9,312,728 B2 * | 4/2016 | Baarman | ................ | H02J 5/005 |
| 9,396,869 B2 * | 7/2016 | Hsu | ................ | H01F 38/14 |
| 9,407,332 B2 * | 8/2016 | Norconk | ................ | H04B 5/0031 |
| 9,524,822 B2 * | 12/2016 | Baarman | ................ | H02J 5/005 |
| 9,558,884 B2 * | 1/2017 | Shimokawa | ............ | H02J 17/00 |
| 9,608,526 B2 * | 3/2017 | Okura | ................ | H02J 5/005 |
| 9,685,824 B2 * | 6/2017 | Iijima | ................ | H02J 17/00 |
| 9,829,599 B2 * | 11/2017 | Filippenko | ............ | G01V 3/104 |
| 2004/0104706 A1 * | 6/2004 | Ooi | ................ | G01R 31/3613 320/132 |
| 2007/0228833 A1 * | 10/2007 | Stevens | ................ | H02J 5/005 307/45 |
| 2008/0048624 A1 * | 2/2008 | Davison | ................ | H02H 1/06 320/166 |
| 2008/0079392 A1 * | 4/2008 | Baarman | ................ | H02J 7/0072 320/108 |
| 2009/0001941 A1 * | 1/2009 | Hsu | ................ | H02J 7/025 323/211 |
| 2009/0127937 A1 * | 5/2009 | Widmer | ................ | H02J 5/005 307/149 |

(56) References Cited

U.S. PATENT DOCUMENTS

| | | | | |
|---|---|---|---|---|
| 2009/0174263 A1* | 7/2009 | Baarman | H02J 5/005 | 307/104 |
| 2009/0212736 A1* | 8/2009 | Baarman | H02J 7/0004 | 320/106 |
| 2009/0224723 A1* | 9/2009 | Tanabe | H02J 7/025 | 320/108 |
| 2009/0243397 A1* | 10/2009 | Cook | H02J 5/005 | 307/104 |
| 2009/0284218 A1* | 11/2009 | Mohammadian | G06K 7/0008 | 320/107 |
| 2009/0284220 A1* | 11/2009 | Toncich | G06K 7/0008 | 320/108 |
| 2009/0284227 A1* | 11/2009 | Mohammadian | G06K 7/0008 | 320/137 |
| 2010/0121511 A1* | 5/2010 | Onnerud | B60L 11/1851 | 701/22 |
| 2010/0156343 A1* | 6/2010 | Jung | H02J 7/025 | 320/108 |
| 2010/0181961 A1* | 7/2010 | Novak | H02J 7/025 | 320/108 |
| 2010/0194206 A1* | 8/2010 | Burdo | G06F 1/266 | 307/104 |
| 2010/0201201 A1* | 8/2010 | Mobarhan | H02J 5/005 | 307/104 |
| 2010/0201311 A1* | 8/2010 | Lyell Kirby | A61L 2/02 | 320/108 |
| 2010/0201312 A1* | 8/2010 | Kirby | H02J 7/025 | 320/108 |
| 2010/0201314 A1* | 8/2010 | Toncich | H02J 7/007 | 320/108 |
| 2010/0201533 A1* | 8/2010 | Kirby | H02J 7/025 | 340/636.1 |
| 2010/0207572 A1* | 8/2010 | Kirby | H02J 7/355 | 320/101 |
| 2010/0225272 A1* | 9/2010 | Kirby | H04B 5/00 | 320/108 |
| 2010/0253281 A1* | 10/2010 | Li | H02J 7/0027 | 320/108 |
| 2010/0277120 A1* | 11/2010 | Cook | H01Q 19/005 | 320/108 |
| 2011/0043327 A1* | 2/2011 | Baarman | H02J 5/005 | 340/5.8 |
| 2011/0115303 A1* | 5/2011 | Baarman | H02J 17/00 | 307/104 |
| 2011/0115431 A1* | 5/2011 | Dunworth | G06Q 30/0267 | 320/108 |
| 2011/0169446 A1* | 7/2011 | Kondo | H01M 10/4257 | 320/108 |
| 2011/0196544 A1* | 8/2011 | Baarman | H01F 38/14 | 700/291 |
| 2011/0204711 A1* | 8/2011 | Norconk | H02J 5/005 | 307/3 |
| 2011/0215086 A1* | 9/2011 | Yeh | F21V 23/02 | 219/488 |
| 2011/0309791 A1* | 12/2011 | Mitake | B60L 11/1816 | 320/108 |
| 2012/0099618 A1* | 4/2012 | Nishi | G01K 7/42 | 374/152 |
| 2012/0104997 A1* | 5/2012 | Carobolante | H02J 7/025 | 320/108 |
| 2012/0119588 A1* | 5/2012 | Baarman | H02J 5/005 | 307/104 |
| 2012/0133324 A1* | 5/2012 | Baarman | H02J 7/0004 | 320/106 |
| 2012/0235637 A1* | 9/2012 | Tanabe | H02J 7/025 | 320/108 |
| 2012/0293008 A1* | 11/2012 | Park | H02J 5/005 | 307/104 |
| 2012/0313562 A1* | 12/2012 | Murao | B60L 3/0046 | 318/139 |
| 2013/0099592 A1* | 4/2013 | Abe | H02J 5/005 | 307/104 |
| 2013/0147428 A1* | 6/2013 | Kirby | A61L 2/02 | 320/108 |
| 2013/0147429 A1* | 6/2013 | Kirby | H02J 7/025 | 320/108 |
| 2013/0154552 A1* | 6/2013 | Siessegger | H02J 7/0047 | 320/108 |
| 2013/0162220 A1* | 6/2013 | Iijima | H02J 7/0052 | 320/137 |
| 2013/0176023 A1* | 7/2013 | Komiyama | G01R 33/028 | 324/258 |
| 2013/0200842 A1* | 8/2013 | Takahashi | H04B 5/0037 | 320/108 |
| 2013/0234532 A1* | 9/2013 | Fells | H02J 5/005 | 307/104 |
| 2013/0260676 A1* | 10/2013 | Singh | H04B 5/0037 | 455/41.1 |
| 2013/0300358 A1* | 11/2013 | Kirby | G06K 7/0008 | 320/108 |
| 2013/0307468 A1* | 11/2013 | Lee | H02J 7/0052 | 320/108 |
| 2014/0009109 A1* | 1/2014 | Lee | H02J 17/00 | 320/108 |
| 2014/0028108 A1* | 1/2014 | Hsu | H01F 38/14 | 307/104 |
| 2014/0077616 A1* | 3/2014 | Baarman | H01F 38/14 | 307/104 |
| 2014/0103881 A1* | 4/2014 | Mohammadian | G06K 7/0008 | 320/137 |
| 2014/0111154 A1* | 4/2014 | Roy | G01V 3/081 | 320/108 |
| 2014/0125146 A1* | 5/2014 | Azancot | H01F 38/14 | 307/104 |
| 2014/0125147 A1* | 5/2014 | Azancot | H01F 38/14 | 307/104 |
| 2014/0159502 A1* | 6/2014 | Shimokawa | H02J 17/00 | 307/104 |
| 2014/0232196 A1* | 8/2014 | Cameron | G05F 1/67 | 307/82 |
| 2014/0340036 A1* | 11/2014 | Toncich | H02J 7/007 | 320/108 |
| 2014/0368167 A1* | 12/2014 | Okura | H02J 5/005 | 320/109 |
| 2015/0054456 A1* | 2/2015 | Yamakawa | B60L 11/182 | 320/108 |
| 2015/0115735 A1* | 4/2015 | Singh | H04B 5/0037 | 307/104 |
| 2015/0236533 A1* | 8/2015 | Yamamoto | H02J 7/0013 | 320/108 |
| 2016/0105056 A1* | 4/2016 | Namurdri | H02J 7/02 | 320/108 |
| 2016/0172895 A1* | 6/2016 | Lee | H02J 17/00 | 320/108 |
| 2017/0063165 A1* | 3/2017 | Baarman | H02J 5/005 | |

FOREIGN PATENT DOCUMENTS

| | | |
|---|---|---|
| DE | 102011004215 A1 | 8/2012 |
| EP | 0820653 B1 | 6/1999 |
| EP | 2372863 A2 | 10/2011 |
| WO | 2011097608 A2 | 8/2011 |

* cited by examiner

BATTERY CHARGING SYSTEM AND METHOD FOR CABLELESS CHARGING OF A BATTERY WITH VOLTAGE AND CURRENT SENSORS ON BOTH THE PRIMARY AND SECONDARY SIDES AND A DC-DC CONVERTER ON THE PRIMARY SIDE INVOLVED IN AN EFFICIENCY CALIBRATION POWER LOOP

BACKGROUND OF THE INVENTION

Field of the Invention

The invention relates to a battery charging system and a method for cableless charging of a battery, in particular a battery of an electric vehicle.

A battery charger of the kind that can be used for charging traction batteries is usually implemented as an electronically controlled DC voltage and current source. During charging, a controlled charging current with final voltage limiting can be applied, for example, up to a particular end-of-charge voltage. A charging characteristic can provide a variable charging current depending on the type of battery.

DE 27 09 863 A1 discloses an automatic electric battery charger which comprises a device for monitoring the charging current and setting it to a predetermined value. The battery charger also comprises a device which is responsive to the battery voltage and which reduces said value as a function of the battery voltage in the course of the charging process.

A charging device for motor vehicles is known, for example, from DE 10 2011 004 215 A1. This charging device has an overload switch which is opened if a current strength above a current strength limit value is present over a minimum period. A motor vehicle having a battery to be charged can be connected to the charging device by means of a charging cable.

EP 0 820 653 B1 discloses a traction battery charging system using inductive coupling. Charging energy is transferred from a charging station to an electric vehicle as alternating current in the 10 to 200 kHz range and is rectified in the electric vehicle. The traction battery charging system is designed to be suitable in particular for vehicles equipped with a battery energy management system (BEMS). An on-board battery-specific charging control module provided in the electric vehicle makes decisions and sends signals in respect of the magnitude and time of the charging current to the charging station. In EP 0 820 653 B1 the charging station is termed universal in the sense that it allows a plurality of different electric vehicles to be connected.

BRIEF SUMMARY OF THE INVENTION

The object of the invention is to further develop cableless charging of a battery, in particular of a vehicle battery, with respect to the prior art cited and, in doing so, keep equipment complexity comparatively low while meeting high quality requirements.

This object is achieved according to the invention by a battery charging system having the features set forth below and by a method for cablelessly charging a battery by means of a split battery charging system having the features set forth below. Embodiments and advantages of the invention which are explained in the following description in relation to the battery charging system also apply analogously to the method and vice versa. The battery charging system is suitable in particular for charging the batteries of an electrically powered motor vehicle. The batteries can be, for example, nickel-cadmium or lithium-ion batteries.

The battery charging system for cablelessly charging a battery comprises
- a primary-side charging unit, also referred to as primary side for short,
- a secondary-side charging unit, also referred to as secondary side for short,
- a transformer which has a primary winding as part of the primary side and a secondary winding as part of the secondary side, wherein the battery being charged is to be connected to the secondary-side charging unit,
- a controller on the primary side and on the secondary side,
- a voltage sensor on the primary side and on the secondary side,
- a current sensor on the primary side and on the secondary side,
- a communication unit on the primary side and on the secondary side, wherein a DC/DC converter is provided on the primary side only and this DC/DC converter is implemented as component of a primary-side power control loop, whereas the secondary side has no DC/DC converter.

The invention proceeds from the consideration that, during charging of a battery, the charging current must be measured with sufficient accuracy and in real time in order to adhere to a predefined charging characteristic and make it possible to react sufficiently rapidly to any disturbances. While this requirement is relatively easy to meet in the case of a non-split charger, with a spit charger the separation between primary and secondary side constitutes a potential weak spot in so far as the transmission of data is concerned. In order to ensure sufficiently reliable data transmission between primary and secondary side it is basically possible to provide a serial communication channel having overdimensioned channel capacity. However, for wireless data transmission which is desirable in the case of inductive, split charging systems, a reliable, deterministic communication channel of this kind is much more difficult to implement than for wireline data transmission.

These inherent disadvantages in respect of data transmission in a split battery charging system are avoided according to the invention by providing a primary-side power control arrangement instead of a secondary-side current control arrangement. Dispensing with a secondary-side DC/DC converter required in conventional split charging systems also reduces the complexity on the secondary side of the battery charging system.

The method for wirelessly charging a battery using the split battery charging system comprises the following features:
- Electric power is transferred from a primary side of the battery charging system to a secondary side of the battery charging system by means of a transformer,
- The battery to be charged is connected to the secondary side of the battery charging system,
- The charging current of the battery is controlled by means of a primary-side power control arrangement.

The primary-side power control is based on current and voltage measurements which are performed on the primary side of the battery charging system. On the other hand, the current sensor and voltage sensor on the secondary side of the battery charging system are not used to perform current or voltage control during the charging process. Rather the current sensor and voltage sensor on the secondary side functions have functions associated with calibration of the battery charging system.

For the purpose of said calibration, electric power is first applied to the primary side of the battery charging system, said electric power being safely below the permissible maximum loading taking all tolerances into account, also in respect of the secondary side. This prevents the battery under charge from being damaged by the calibration process. The power supplied for calibration is preferably fixed at different levels successively, e.g. 10% and 90% of the maximum permissible power.

On the basis of the known supplied power, during calibration the current and voltage are measured on the secondary side of the battery charging system to determine the transformer efficiency. When calibration is complete, the charging current of the battery is controlled not using direct, secondary-side measurement of the charging current, but solely indirectly, namely by means of a power control arrangement on the primary side of the battery charging system. In a preferred embodiment, the current and voltage sensors used for this power control arrangement have a lower measuring accuracy than the secondary-side current and voltage sensors used for calibration. As the primary-side current and voltage sensors are not involved in the calibration process, the lower measuring accuracy suffices for these sensors. In the case of the secondary-side current and voltage sensors, the measuring accuracy in the ranges available for operation of the battery charging system, including calibration and power control, is preferably at least twice as great, with particular preference at least four times as great, e.g. at least ten times as great, as that of the primary-side current and voltage sensors.

Using the described calibration, in addition to the efficiency of the transformer, measuring and amplification parameters such as offset and gain in particular are determined independently of the individual power data of the devices for determining the current, voltage and power.

According to an advantageous further development, calibration is performed cyclically, i.e. periodically in the course of charging of the battery. The subsequent calibration steps following initial calibration are also termed recalibration. Compared to the total duration of the charging process, all the calibration processes added together only amount to a comparatively small period of time, e.g. less than 2% of the overall charging time.

The battery under charge places only a slowly and continuously varying load on the battery charging system. It must also be assumed that under normal operating conditions the transformer has at most slowly varying electrical characteristics. With the cyclical recalibrations, quasi steady-state measured values of current and voltage are therefore read out on the secondary side of the battery charging system. In spite of the virtually only isolated calibrations—viewed along the time axis—compared to the overall charging operation, a predefined charging curve can be very precisely maintained. Particularly advantageous here compared to conventional, secondary-side charging current control is the fact that no dead times of any kind occur which would necessarily arise in the case of secondary-side measurement and subsequent transfer to the primary side.

According to an advantageous further development, monitoring and protection functions are implemented in the battery charging system independently of the ongoing control of the charging process by the power control arrangement, wherein, in particular, measurement-providing components on the secondary side can be accessed. In particular, current and voltage values can be monitored on the secondary side in respect of threshold values being exceeded, wherein information about threshold value overshoots is transmitted automatically, usually wirelessly, to the primary side. Depending on the type of deviation from intended operation as determined by means of threshold value monitoring, automatic aborting of the charging process can also be provided.

A significant disturbance of the intended operation of the battery charging system could be theoretically caused, for example, by a metal object in the air gap of the transformer. This would cause the object to heat up, with the active power increasing on the primary side while tending to decrease on the secondary side. Overloading of the battery being charged is therefore unlikely to result from a metal object being introduced into the air gap of the transformer. Rather the changed, impaired characteristics of the transformer should be compensated by control and calibration. However, if the metal object is removed from the transformer's air gap again, the battery could be briefly overloaded because of the abruptly improved characteristics of the transformer. In a hypothetical case of this kind, the secondary-side threshold value monitoring would take effect and protect the battery from overloading. However, no control function exists on the secondary side of the battery charging system during intended operation.

The particular advantage of the invention is that a secondary-side DC/DC converter is dispensed with in the case of a split battery charging system, as a charging current substitute value can be used for sufficiently precise charging current control as part of primary-side power control if the characteristics of the transformer constituting the interface between primary side and secondary side are known, wherein a particularly robust execution of the charging process is provided as a result of concentrating the control components on the primary side of the battery charging system.

BRIEF DESCRIPTION OF THE SEVERAL VIEWS OF THE DRAWING

An exemplary embodiment of the invention and an embodiment (not claimed) of a battery charging system for illustration will now be explained in greater detail with reference to the accompanying drawings in which:

DESCRIPTION OF THE INVENTION

In all the figures, components that are essentially identical or have an identical effect are denoted by the same reference characters.

To explain the preliminary considerations, reference will first be made to FIG. 3 which shows the basic design of a possible, non-split battery charger 1.

The battery charger denoted as an entity by the reference character 1 is used to charge a battery 2 and comprises a voltage supply 3 which delivers an AC voltage, an AC/DC converter 34, a DC/DC converter 4, a controller 5, a current sensor 6, and a voltage sensor 7. Also provided is a communication unit 8 for exchanging data, e.g. with a higher-level controller.

Figure 3:
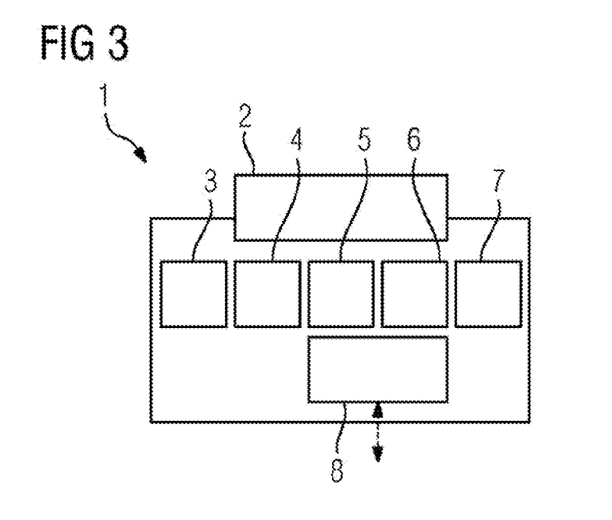
FIG. 3 is a block diagram showing the basic design of a non-split battery charging system (not claimed)

The entire battery charger 1 according to FIG. 3 is implemented as a single unit to which the battery 2 is connected e.g. using a cable or an adapter.

Figure 1:
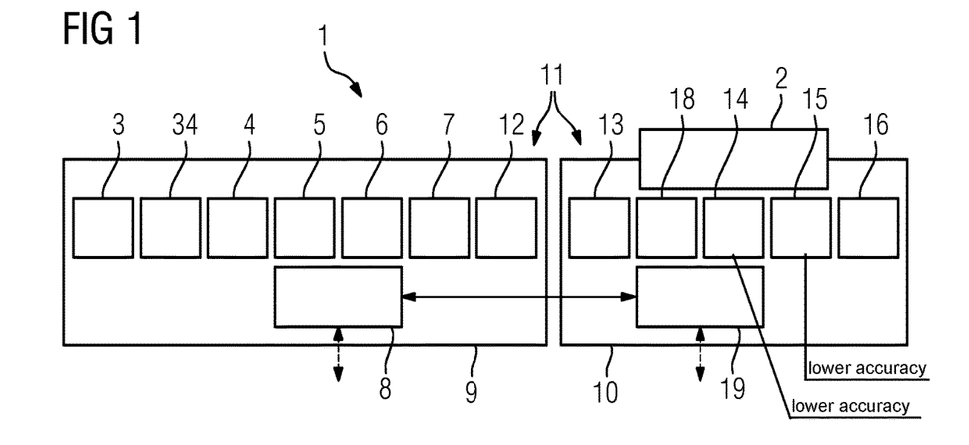
FIG. 1 is a block diagram showing the rough layout of a battery charging system according to the invention.
Figure 2:
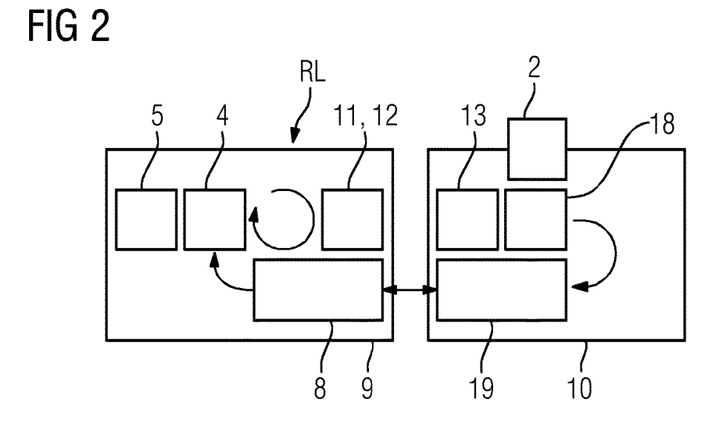
FIG. 2 shows the control arrangement of the battery charging system according to FIG. 1 in a simplified representation compared to FIG. 1.

The control of the charging process, relating to the non-split battery 1 according to FIG. 1, is illustrated in FIG. 2. A single control loop is present, referred to as the main control loop RH.

By contrast to FIGS. 1 and 2, FIGS. 3 and 4 show a split battery charger which, because of its more complex, split design, is referred to as a battery charging system 1.

The battery charging system 1 is composed of a primary-side charging unit 9, also referred to as the primary side for short, and a secondary-side charging unit 10, also referred to as the secondary side for short. The interface between the primary side 9 and the secondary side 10 is constituted by a transformer 11 having a primary winding 12 and a secondary winding 13. Apart from the transformer 11, the split battery charging system 1 according to FIG. 3 also differs from the apparatus according to FIG. 1 in that no current measurement is performed on the primary side 9. On the other hand, there is both a current sensor 14 and a voltage sensor 15 on the secondary side 10. Additionally present on the secondary side 10, typically inside a vehicle, is an auxiliary voltage supply 16. The secondary side 10 also has a DC/DC converter 17, a controller 18, and a communication unit 19.

Figure 4:
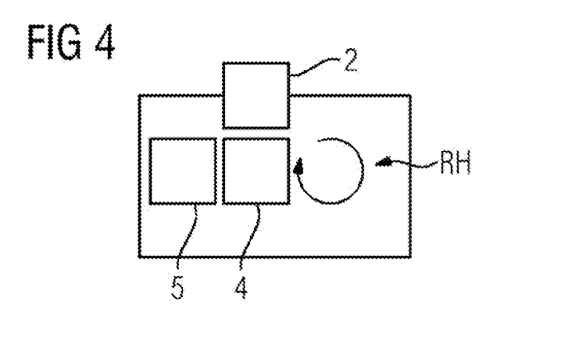
FIG. 4 shows the control of the battery charging system according to FIG. 3 in a representation analogous to FIG. 2.
Figure 5:
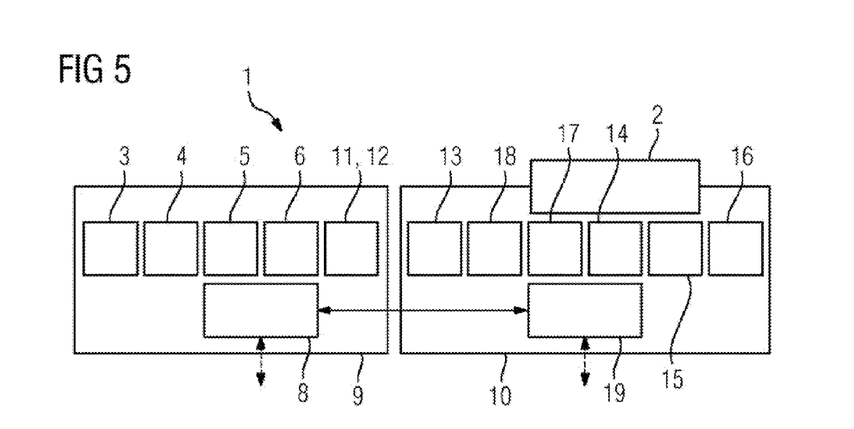
FIG. 5 is a block diagram showing the basic design of a split battery charging system (not claimed)
Figure 6:
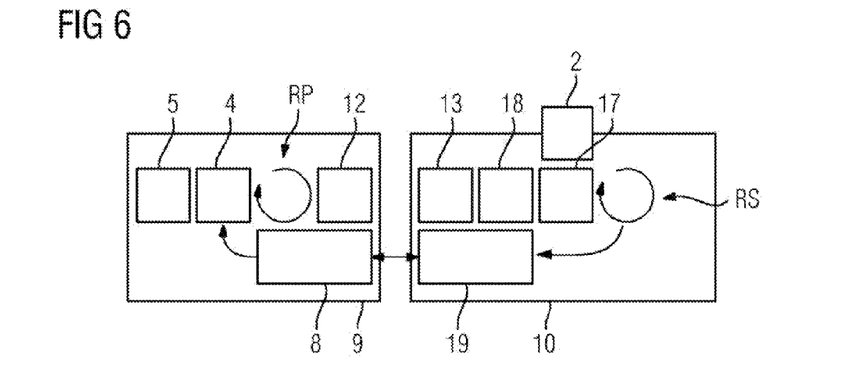
FIG. 6 shows the control of the battery charging system according to FIG. 5 in a representation analogous to FIG. 2.

As can be seen from FIG. 4, in the case of the split battery charging system 1 according to FIG. 3, two control loops are formed, namely a primary control loop RP on the primary side 9 and a secondary control loop RS on the secondary side 10.

The primary control loop RP is here a voltage control loop and the secondary control loop RS a current control loop. The charging current of the battery 2 is therefore actually controlled by the secondary-side DC/DC converter 17.

Not integrated within the two control loops is an information flow from the secondary side 10 to the primary side 9 via the two communication units 8,17. Similarly to the example according to FIG. 1, in the case of the battery charging system 1 according to FIG. 3 the communication units 8,17 can also exchange data with a higher-level controller.

In the case of the battery charging system 1 according to FIG. 3, the two control loops RP and RS are hierarchically separated from one another. The communication passing via the communication units 8,17 is used solely for information, warning or protection functions, as well as for data transmission in the case of asynchronous events. Such events include, for example, switching on and off, as well as emergency shutdown of the battery charging system 1.

In contrast to FIGS. 3 to 6, FIGS. 1 and 2 show a battery charging system 1 in which all the features of the invention are implemented.

The battery charging system 1 according to FIG. 1 is designed for charging an electric vehicle, wherein the primary-side charging unit 9 is implemented as a stationary device, whereas the secondary-side charging unit 10 is onboard an electrically powered vehicle such as, for example, a motor scooter, motorcycle, automobile, bus, truck or agricultural vehicle.

Unlike the primary-side charging unit 9 of the apparatus according to FIG. 3, the battery charging system 1 according to FIG. 1 also has a current sensor 6 on the primary side 9. This current sensor 6 is used in conjunction with the likewise primary-side voltage sensor 7 for power control by means of a primary-side power control loop RL indicated in FIG. 2. This power control loop RL constitutes a single control loop within the battery charging system 1 and is used for indirectly controlling the current flowing from the secondary side 10 to the battery 2.

Figure 7:
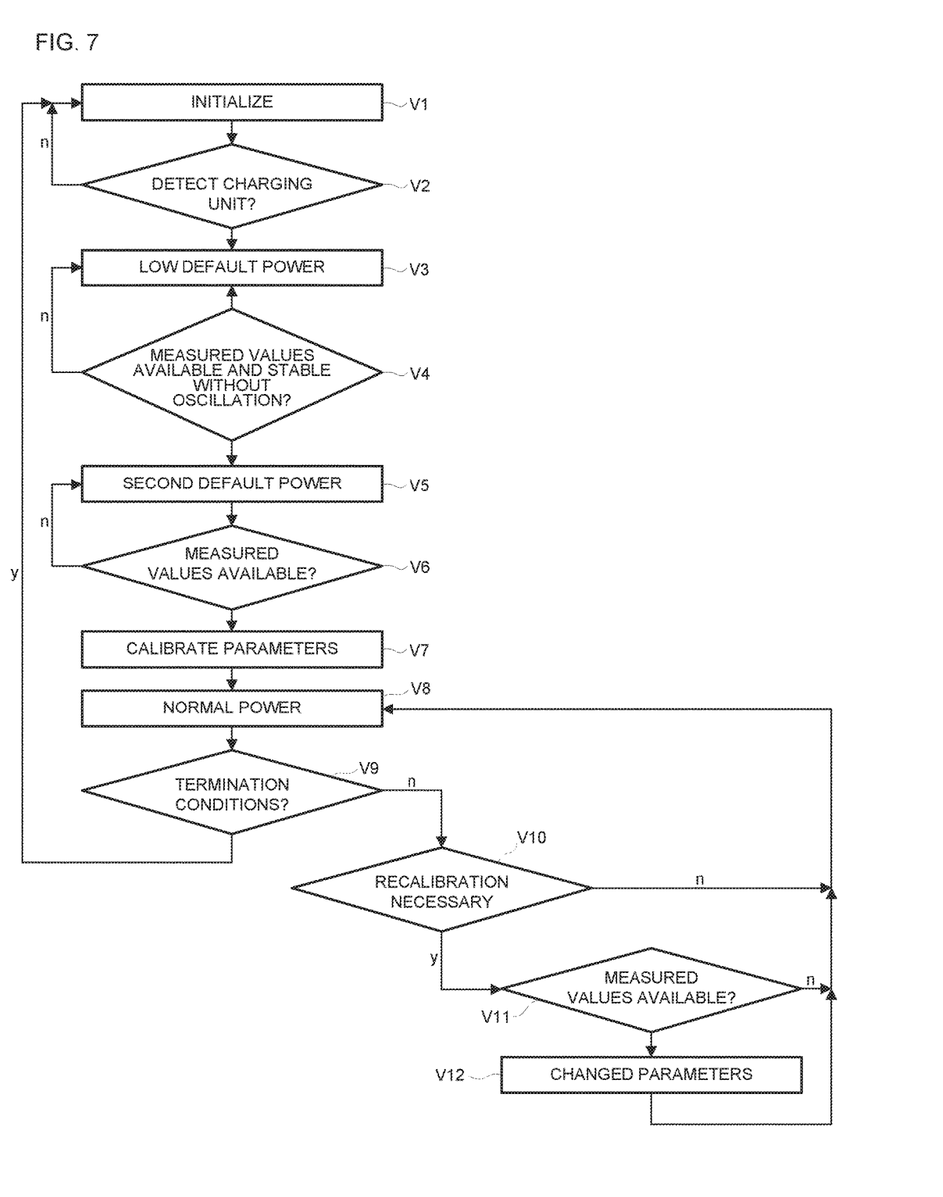
FIG. 7 is a flow chart showing the operation of the battery charging system according to FIG. 1.

Neither a control loop nor a DC/DC converter are provided on the secondary side 10 of the battery charging system 1 according to FIG. 1. To calibrate parameters of the power control loop RL, current and voltage values are measured by means of a secondary-side current sensor 14 and a secondary-side voltage sensor 15 and used in a calibration process which is illustrated in a flow chart in FIG. 7:

The start of the method, in which initialization of the primary-side charging unit 9 is provided, is referred to as the first method step V1. In the next method step V2, it is automatically inquired whether the secondary-side, i.e. vehicle-mounted, charging unit 10 can be detected. If this is the case, in the third method step V3 a power of the primary side 9 is fixed to a first, low default value of e.g. 10% of the maximum power.

Then in the subsequent fourth method step V4 it is tested whether the at least one measured value obtained on the secondary side, namely current or voltage value, is available in a stable manner, without oscillation. If this condition is fulfilled, in the fifth method step V5 the primary-side power is set to a second default value that is many times higher than the power value selected in method step V3, but still provides a sufficient safety margin with respect to the maximum permissible power with which the secondary-side charging unit 10 may charge the battery 2, taking all the tolerances existing at this stage of the method into account. As in method step V4, in the subsequent method step V6 it is again checked whether the current and voltage measurements obtained are available in sufficient quality. If this is not the case, method step V5 is repeated, like method step V3 previously if necessary. Otherwise, in method step V7 parameters to be used for power control are calibrated. In particular, the gain and possibly an offset are determined. This completes all the steps required for initial calibration and the power of the primary side 9 is set to a suitable normal value in method step V8.

During the charging process, in method step V9 it is periodically or permanently inquired whether the condition or conditions for termination of the charging process are fulfilled. As soon as this is the case, the state of the primary-side charging unit 9 is reset to the state obtaining in method step V1, also termed wait status.

As long as the charging process is not yet complete, in method step V10 it is periodically inquired whether recalibration is necessary. In the simplest case, recalibration must take place after a particular time interval has elapsed. The recalibration comprises measurement processes combined within method step V11 which include the steps to be carried out in method steps V3 to V6, in particular testing whether measured values are available in sufficient quality. On completion of method step V11, recalibration which may result in a changed parameterization (method step V8) takes place in method step V12. The charging process then proceeds using the updated parameterization until the conditions for termination of charging of the battery 2 (method step V9) are fulfilled.

Figure 8:
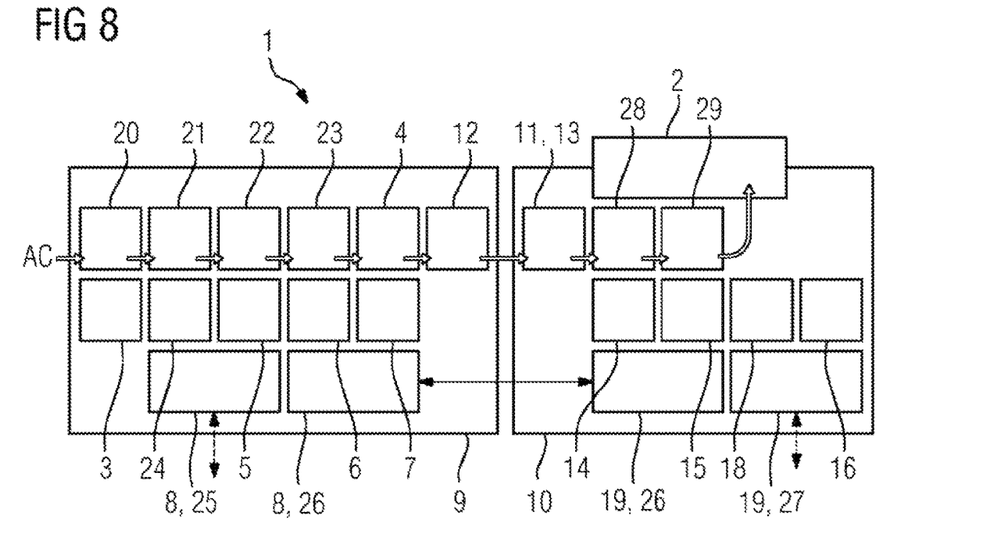
FIG. 8 shows the battery charging system according to FIG. 1 in a more detailed representation than in FIG. 1.

The block diagram according to FIG. 8 shows in more detail the battery charging system 1 according to FIG. 1 which can be used to carry out the charging method explained with reference to FIG. 7, including charging control and calibration.

In addition to the primary-side components of the battery charging system 1 as shown in FIG. 1, FIG. 8 shows a rectifier 20, a power factor correction (PFC) filter 21, a DC link 22, and an amplifier 23. The DC/DC converter 4 is implemented as a resonance-type converter. Also shown in FIG. 8 is a fan controller 24 on the primary side. The primary-side communication unit 8 is comprised of a supply communication element 25 which has a function in a public power grid, and an internal communication element 26 which can be used for calibration and maintenance purposes.

Similarly, the secondary-side communication unit 19 is also comprised of a plurality of components which do not necessarily have to be physically separate from one another. In addition to an internal communication element 26, an on-board vehicle communication element 27 is present on the secondary side 10.

The supply of electrical energy from the secondary side 10 of the battery charging system 1 to the battery 2 takes place, as shown in FIG. 8, from the secondary winding 13 via a rectifier 28 and a capacitor 29. As already explained in connection with FIG. 1, a DC/DC converter is not required on the secondary side 10 of the battery charging system 1, as conventional charging current control is replaced by primary-side power control, the calibration processes described above continuously ensuring precise control.

The invention claimed is:

1. A battery charging system for cablelessly charging a battery, the battery charging system comprising:
    a primary-side charging unit as a primary side;
    a secondary-side charging unit as a secondary side;
    a transformer having a primary winding as part of said primary side and a secondary winding as part of said secondary side;
    a controller on said primary side and a controller on said secondary side;
    a voltage sensor on said primary side and a voltage sensor on said secondary side;
    a current sensor on said primary side and a current sensor on said secondary side;
    a communication unit on said primary side and a communication unit on said secondary side; and
    a DC/DC converter disposed only on said primary side and implemented as a component of a single, primary-side power control loop of the battery charging system for solely indirect control of a charging current of the battery, said power control loop having parameters determined by a calibration process periodically carried out during charging of the battery, and said calibration process determining an efficiency of said transformer based on current and voltage values respectively measured by said secondary-side current sensor and said secondary-side voltage sensor;
    said calibration process including testing whether at least one measured value is stable without oscillation;
    wherein said single, primary-side control loop is configured to indirectly control the charging current of the battery and to be a sole control loop controlling the charging current of the battery.

2. The battery charging system according to claim 1, wherein said secondary-side voltage sensor has a higher measuring accuracy than said primary-side voltage sensor.

3. The battery charging system according to claim 1, wherein said secondary-side current sensor has a higher measuring accuracy than said primary-side current sensor.

4. An electric vehicle, comprising a battery charging system according to claim 1 for charging the electric vehicle.

5. The battery charging system according to claim 1, wherein said calibration process includes initially setting a power of said primary side to a fraction of a maximum power and, upon determining that the at least one measured value is stable without oscillation, subsequently setting the power of said primary side to at least a multiple of the fraction of the maximum power.

6. A method for cablelessly charging a battery by using a split battery charging system, the method comprising the following steps:
    transferring electric power from a primary side of the battery charging system to a secondary side of the battery charging system using a transformer;
    connecting the battery to be charged to the secondary side of the battery charging system;
    controlling a charging current of the battery solely indirectly by a single power control loop disposed on the primary side; and
    periodically carrying out a calibration process during charging of the battery in which efficiency changes of the transformer are detected and compensated by adjusting parameters of the primary-side power control loop, wherein the calibration process includes testing whether at least one measured value is stable without oscillation.

7. The method according to claim 6, which further comprises monitoring measured values of current and voltage on the secondary side for threshold values being exceeded, and automatically transmitting information about overshooting threshold values to the primary side.

8. The method according to claim 6, wherein the calibration process includes initially setting a power of the primary side of the battery charging system to a fraction of a maximum power and, upon determining that the at least one measured value is stable without oscillation, subsequently setting the power of the primary side of the battery charging system to at least a multiple of the fraction of the maximum power.

* * * * *